United States Patent [19]

Cameron

[11] Patent Number: 4,578,262

[45] Date of Patent: Mar. 25, 1986

[54] LIQUID SULPHUR DIOXIDE MANUFACTURE

[75] Inventor: Gordon M. Cameron, North York, Canada

[73] Assignee: C-I-L Inc., North York, Canada

[21] Appl. No.: 598,004

[22] Filed: Apr. 9, 1984

[30] Foreign Application Priority Data

Apr. 29, 1983 [CA] Canada ................................ 427116

[51] Int. Cl.[4] ...................... C01B 17/98; C01B 17/74; C01B 17/54
[52] U.S. Cl. .................................. 423/522; 423/533; 423/539; 423/543
[58] Field of Search ............... 423/522, 533, 539, 540, 423/542, 543

[56] References Cited

U.S. PATENT DOCUMENTS

| | | | |
|---|---|---|---|
| 1,447,645 | 3/1923 | Chase et al. | 423/542 |
| 3,803,297 | 4/1974 | Guth et al. | 423/533 |
| 3,803,298 | 4/1974 | Guth et al. | 423/543 |
| 3,907,797 | 9/1975 | Jenniges | 423/533 |
| 3,994,706 | 11/1976 | Duvall | 423/542 |
| 4,212,855 | 7/1980 | Kerner et al. | 423/522 |
| 4,490,347 | 12/1984 | Gelblum | 423/540 |

FOREIGN PATENT DOCUMENTS

| | | | |
|---|---|---|---|
| 2737 | 7/1979 | European Pat. Off. | 423/543 |
| R2907455 | 5/1978 | Fed. Rep. of Germany | 423/543 |
| 2930522 | 2/1981 | Fed. Rep. of Germany | 423/539 |
| 46-31122 | 9/1971 | Japan | 423/543 |
| 47-15447 | 5/1972 | Japan | 423/543 |
| 252928 | 6/1926 | United Kingdom | 423/542 |
| 996480 | 6/1965 | United Kingdom | 423/542 |

Primary Examiner—Gary P. Straub
Attorney, Agent, or Firm—C. Brian Barlow

[57] ABSTRACT

Process for the production of liquid sulphur dioxide in a sulphur dioxide facility forming part of a sulphuric acid plant wherein a portion of the sulphur dioxide produced in a sulphur burning furnace is directed to a sulphur dioxide liquefaction means and the resultant tail gas is recycled to the furnace. Relatively high sulphur dioxide concentrations are maintained in all parts of the sulphur dioxide production cycle allowing higher strength sulphur dioxide gases to be generated without overheating the furnace and also lower power requirements in the sulphur dioxide liquefaction step.

1 Claim, 1 Drawing Figure

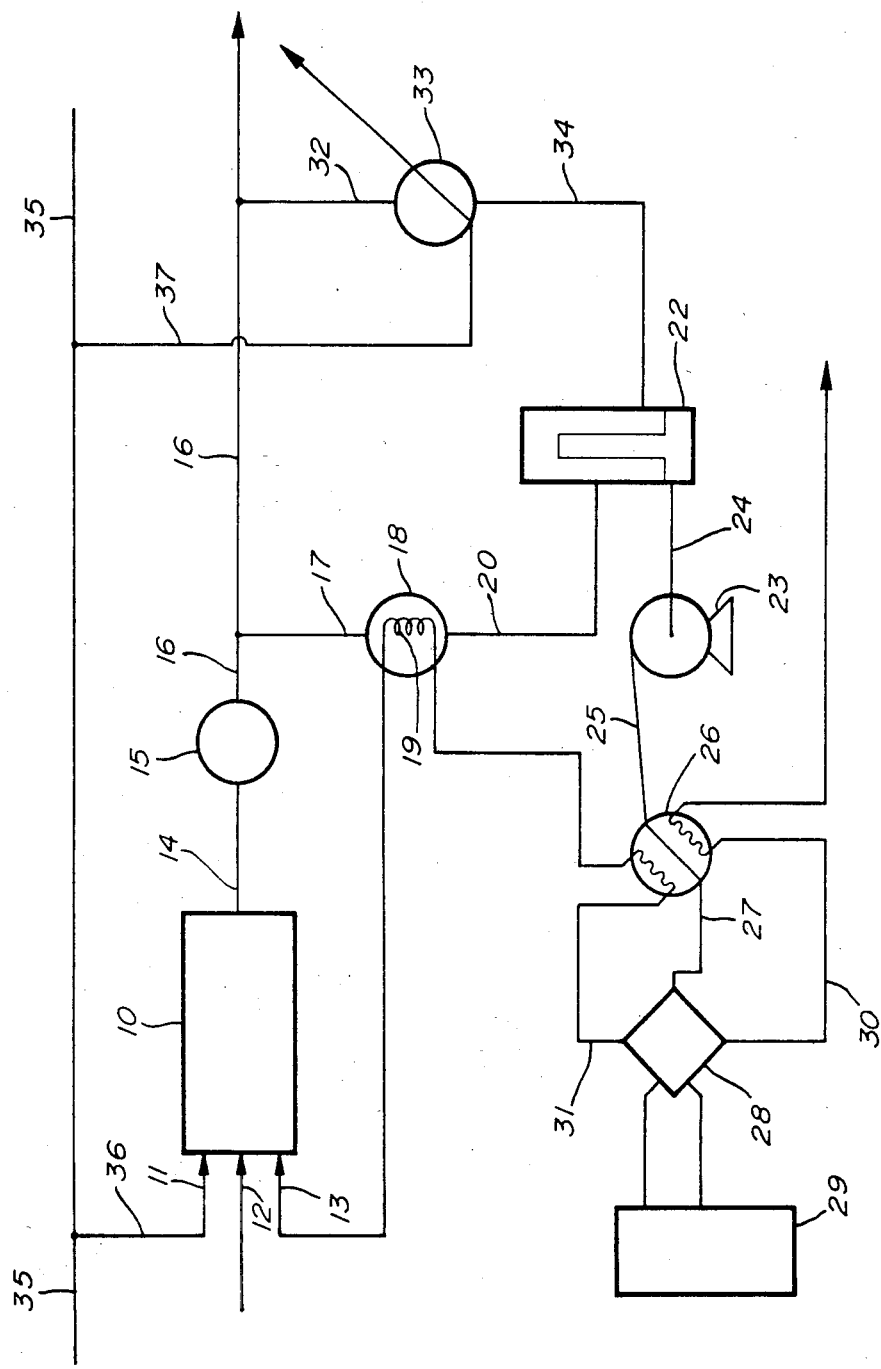

LIQUID SULPHUR DIOXIDE MANUFACTURE

This invention relates to the manufacture of liquid sulphur dioxide and more particularly to a sulphur dioxide facility forming part of a sulphuric acid plant.

Liquefied sulphur dioxide is manufactured industrially from several different sulphur containing feedstocks such as sulphur, sulphide ores, and sulphur bearing hydrocarbon oils or coal, and by a variety of routes. The conventional routes can be split generally into routes involving absorption and desorption of sulphur dioxide using solvents on the one hand and routes involving the reaction of sulphur with sulphur trioxide on the other hand. Yet another route involving direct liquefaction of sulphur dioxide from process gases is also possible but impracticable unless gases very strong in sulphur dioxide content are available. In all cases, the manufacturing processes require eventual drying of the sulphur dioxide gases prior to liquefaction. Compression or refrigeration or some combination are normally required then to produce the liquid product by condensation from the dry gas.

The absorption-desorption routes generally use a variety of sulphite-bisulphite solutions such as ammonium sulphite-bisulphite and other alkaline sulphite-bisulphite solutions, or organic solvents such as dimethyl aniline. Some of the routes use energy to strip the sulphur dioxide from the rich solution while the sulphite-bisulphite routes frequently use acidification by sulphuric acid which gives an ammonium sulphate by-product which is now becoming less-and-less useful and saleable in modern fertilizer operations. Whether by use of energy or acidification, the absorption-desorption routes are expensive to operate.

The second series of routes involves the spontaneous reaction of sulphur with sulphur trioxide either in oleum or in the gas phase to form sulphur dioxide and heat, followed by purification of the sulphur dioxide and liquefaction. These routes tend to be relatively complex and depend on oleum production facilities in the sulphuric acid manufacturing complex.

It is theoretically possible, of course, to condense sulphur dioxide from any gas stream containing sulphur dioxide by appropriate compression and/or refrigeration but power requirements and the capital cost of such equipment are prohibitive if the sulphur dioxide content of the gas is lower than say 10% by volume. A gas stream containing 4% sulphur dioxide for instance has a condensation temperature of below $-80°$ C., a very difficult level to reach with conventional refrigeration equipment and outside the classic cryogenic approaches used in liquid air manufacture.

Direct liquefaction of sulphur dioxide from gases produced by combustion of sulphur with air is normally also not practised as the moisture and potential sulphur trioxide associated pose serious material problems in the plant. Also, very high temperatures (Ca. 1600° C.) are associated with the strongest sulphur dioxide gases. These high temperatures pose severe problems to furnace brick and also, if not well controlled, can result in sulphur carryover or formation of sulphur trioxide or nitric oxide, both of which are undesirable in a liquid sulphur dioxide process. Such combustion systems are often used, however, to provide sulphur dioxide rich gases for absorption routes whether to make sulphite-bisulphite solutions for use or for stripping.

The most common source of sulphur dioxide gas is in sulphuric acid plants using sulphur as a feedstock. Present technology in sulphur combustion normally produces a gas containing only up to 11–12% sulphur dioxide, the concentration being limited by brick materials and the need to avoid formation of significant quantities of nitric oxide, a process which accelerates very rapidly as the temperature rises above 1100° C. The gas stream also contains some sulphur trioxide and will contain traces of sulphuric acid vapour, both of which would contaminate any liquid sulphur dioxide product. Using such a gas source with 12% sulphur dioxide at a sulphur dioxide liquefaction unit inlet would require condensation initially at temperatures in the range of $-50°$ C. with this temperature dropping as sulphur dioxide is removed. In addition, processing the total stream to remove a small fraction of the sulphur dioxide present would add significant resistance to the gas flow path, thus reducing the acid plant throughput, a detrimental consequence of such a process.

With air which has been dried, it is also possible to produce sulphur dioxide in liquid form from gases produced by sulphur combustion but, as above mentioned, sulphur trioxide and nitric oxide must not be present at the liquefaction stage or the product will be contaminated and of low or no value. While sulphur trioxide removal by scrubbing or absorption can be incorporated in such a process, removal of nitric oxide is very difficult and the only practicable route at this time is to operate the sulphur combustion step at temperatures below 1100° C. where negligible nitric oxide is formed. Unfortunately, such temperatures correspond to sulphur dioxide concentrations in the range 10–12% v/v instead of the stoichiometric 21% v/v. The result is not only to double the flow of gas in the sulohur dioxide plant but also to lower the partial pressure of sulphur dioxide in the steam and the condensation temperature, resulting in a significant increase in the power required to liquefy the sulphur dioxide product. With conventional sulphuric acid plants, such a facility could require a condensation temperature of as low as $-80°$ C. which is beyond the range of most normal refrigeration systems.

It is also worth noting that liquefied sulphur dioxide consumption in industry is less than sulphuric acid by a factor of close to 100, i.e. annual markets for acid of 30,000,000 tons/annum vs. markets for sulphur dioxide of around 300,000 tons/annum and further that sulphur dioxide markets are distributed with a variety of small consumers if sulphuric acid plant capacities are used as a standard.

The process of the present invention is based on a recycle of sulphur dioxide gas from the exit of the acid plant boiler through cleaning and cooling equipment to refrigeration means where part of the sulphur dioxide is condensed. All or some of the remaining gas which contains significant uncondensed sulphur dioxide is then recycled and introduced to the furnace where it replaces excess air that was previously used in the furnace to keep temperatures below 1100° C. to avoid nitric oxide formation and furnace damage. By so doing, the sulfur dioxide gas strength leaving the furnace is increased without violation of the temperature constraint or formation of nitric oxide and a portion of this strong sulphur dioxide gas is provided for the liquefaction operation.

Accordingly, one object of this invention is to provide a sulphur dioxide liquefaction facility which can be incorporated into a conventional sulphuric acid plant to allow liquid sulphur dioxide product to be manufactured as a by-product without significantly affecting sulphuric acid plant capacity.

A second object is to provide an arrangement in which the sulphur dioxide concentration can be increased in the liquefaction step to essentially stoichiometric levels while at the same time avoiding formation of nitric oxide.

Accordingly, there is provided a process for the production of liquefied sulphur dioxide, which process comprises (a) feeding
  (i) air,
  (ii) sulphur, and
  (iii) a sulphur dioxide-gas mixture to a sulphur dioxide producing furnace;
(b) burning said sulphur in said furnace to produce an enriched sulphur dioxide exit gas;
(c) taking off either a portion or the whole of said exit gas and subjecting said portion or said whole to liquefaction means to produce liquid sulphur dioxide and a depleted sulphur dioxide-gas mixture;
(d) isolating said liquid sulphur dioxide; and
(e) recycling either a portion or the whole of said depleted sulphur dioxide-gas mixture to said furnace whereby said depleted sulphur dioxide-gas mixture defines the mixture of (a)(iii); provided that when the whole of said exit gas is subjected to said liquefaction means a portion of said depleted sulphur dioxide-gas mixture is provided as feedstock for a sulphur dioxide-sulphur trioxide catalytic converter.

Preferably, only a portion of the enriched sulphur dioxide furnace exit gas is transferred to the liquefaction means. Accordingly, the invention provides in a preferred aspect a process which comprises (a) feeding
  (i) air,
  (ii) sulphur, and
  (iii) a sulphur dioxide-gas mixture to a sulphur dioxide producing furnace;
(b) burning said sulphur in said furnace to produce an enriched sulphur dioxide exit gas;
(c) taking off a portion of said exit gas and subjecting said portion to liquefaction means to produce liquid sulphur dioxide and a depleted sulphur dioxide-gas mixture;
(d) isolating said liquid sulphur dioxide; and
(e) recycling said depleted sulphur dioxide-gas mixture to said furnace whereby said depleted sulphur dioxide-gas mixture defines the mixture of (a)(iii).

Preferably, the furnace is operated at a temperature below the level at which nitric oxide is formed, which is more preferably below 1200° C.

The essence of the present invention is to allow relatively high sulphur dioxide concentrations to be maintained in portions of the plant where sulphur dioxide is liquefied. Generally, that is to not allow the sulphur dioxide content of the tail gas emanating from the liquefaction means to fall, say, below 6% v/v, but to permit tail gas having a sulphur dioxide content >6% to be recycled to the sulphur dioxide producing furnace. Such a step results in a significant energy saving in the power required to liquefy sulphur dioxide produced on an industrial scale.

Further, recycling of the depleted sulphur dioxide tail gas having a concentration of >6% v/v sulphur dioxide to the furnace allows higher strength sulphur dioxide gases to be generated without overheating the furnace and the concomitant production of nitric oxide. Thus, proven temperature conditions in the combustion of sulphur in a sulphuric acid manufacturing process are maintained.

In order that the invention may be better understood, a preferred embodiment will now be described, by way of example only, with reference to the accompanying drawing which shows a schematic layout of a liquid sulphur dioxide manufacturing facility forming part of a sulphuric acid plant.

The drawing shows a furnace 10 having three feed inlets, namely, an air inlet 11, a sulphur inlet 12 and a sulphur dioxide-gas inlet 13. Furnace 10 also has an outlet 14 connected to a cooler 15 which is provided with a conduit 16 leading to a sulphur dioxide-sulphur trioxide catalytic converter (not shown).

Leading from conduit 16 is a conduit 17 connected to a recycle gas heater 18 having an exchanger coil 19 and an outlet 20 connected via a conduit to a candle mist filter 22 which, in turn, is connected to a recycle and compression fan 23 by means of conduit 24. Fan 23 is connected through conduit 25 to heat exchanger 26, in turn connected via a conduit 27 to a condenser 28.

Condenser 28 and a fluorohydrocarbon refrigeration unit 29 comprise liquefaction means. Condenser 28 is provided with two conduits, namely, a liquid sulphur dioxide conduit 30, which leads through heat exchanger 26 to a liquid sulphur dioxide storage tank (not shown), and a depleted sulphur dioxide-gas mixture conduit 31 which leads through heat exchanger 26 and coil 19 to furnace inlet 13.

Also leading from conduit 16 is a conduit 32 connected to a dilution air heater 33 which, in turn, is connected to the candle filter 22 by a conduit 34.

An air line 35 is provided with two conduits 36 and 37 which are connected to air inlet 11 and, through heater 33, to the catalytic converter, respectively.

In operation, dry air at a pressure in the range 3 to 12 psig enters the system along air line 35 and is split into a combustion air stream through a conduit 36 and into air streams through conduits 37 and 35 continued.

A liquid sulphur stream enters the furnace 10, operating at a temperature Ca. 1100° C., through inlet 12 in an atomized form under pressure where it is mixed and burnt in the air entering through air inlet 11 from conduit 36.

The combustion air stream will typically incorporate enough oxygen to convert the sulphur to sulphur dioxide and enough excess oxygen to ensure that no sulphur passes untreated to the downstream cooler 15.

Also mixed with the combustion air and sulphur in the furnace 10 is the tail gas stream from the sulphur dioxide liquefaction operation, as hereinafter described. This depleted sulphur dioxide-gas mixture enters the furnace 10 through inlet 13.

Furnace exit gas enriched in sulphur dioxide from the burning of the sulphur in the air and having a concentration of <8% v/v oxygen is cooled in cooler 15 to 400°–450° C., which is typical temperature range suitable for the catalysis effected in the converter. The cooler off-gas stream exits through conduit 16 and is split into sulphur dioxide feed gas streams via conduits 17 and 32 and a converter feed gas stream 16.

Feed gas streams in conduits 17 and 32 to the sulphur dioxide operation are cooled, in the embodiment shown, in the recycle gas heater 18 and the dilution air heater 33 respectively, and passed to the candle mist filter 22 wherein the two streams are combined and cleaned of any sulphur trioxide and acid mist which may be present. The cooled and cleaned gas is, then, compressed in the fan 23 to a pressure sufficient to ensure gas flow through the remaining equipment back to the furnace 10.

The clean gas stream from the compression fan is chilled in heat exchanger 26 by return tail gas stream and/or liquid sulphur dioxide product produced as hereinafter described. The chilled gas stream is passed to a condenser 28 which is cooled by a suitable refrigerant to a temperature in the range $-30°$ C. to $-50°$ C., which is a duty within the range of conventional two or multi-stage refrigeration units. Liquefield sulphur dioxide product is run off through conduit 30 via heat exchanger 26. The liquid product can, then, be warmed up by heat transfer or pumped directly to storage.

The tail gas mixture depleted in sulphur dioxide is, then, returned to furnace inlet 13 through conduit 31 via heat exchanger 26 and recycle gas heater 18 through coil 19 whereby it is reheated. The depleted sulphur dioxide gas mixture contains significant quantities of sulphur dioxide, typically 8-12% sulphur dioxide.

Dilution air through conduit 37, which has been by-passed around the furnace as a result of the recycle process, is heated by heat transfer by part of the sulphur dioxide exit gas in dilution air heater 33 and joined with the remainder of the sulphur dioxide exit gas in conduit 16 to form a feed stream to the converter.

In this embodiment, the compression means 23 is shown prior to chilling and liquefaction but it could be located elsewhere in the recycle path in the process.

It will be obvious also to those skilled in the art that a variety of methods of heat exchange between the sulphur dioxide gas being cooled and cold fluids to be heated will be possible, such as for instance, no heating of recycle gas, heating of combustion air, and the like. The circuit could also be modified to take all or some of the converter gas stream 16 after the condenser 28 to maximize sulphur dioxide partial pressure in the condenser and minimize the refrigeration load. The filter means 22 may equally be a scrubber or an absorber.

Further, the process of the invention may be readily operated to provide a furnace exit gas enriched in sulphur dioxide and having a concentration of $<3\%$ v/v oxygen.

I claim:

1. In an existing sulphuric acid facility in which sulfur and dry air are fed to a sulphur dioxide generating furnace and generated sulphur dioxide-containing gas is fed to a waste heat boiler prior to a converter for the production of sulfur trioxide, an improved process permitting the coproduction of liquid sulphur dioxide, the improvement comprising
    (a) feeding a recylcled depleted sulphur dioxide-gas stream to said sulphur dioxide generating furnace;
    (b) taking off a minor portion of said generated sulphur dioxide-containing gas and subjecting said portion to liquefaction means at a temperature in the range $-20°$ C. to $-50°$ C. and at atmospheric pressure, to produce liquid sulphur dioxide and a depleted sulphur dioxide-gas stream;
    (c) isolating said liquid sulphur dioxide;
    (d) recycling said depleted sulphur dioxide-gas stream to said furnace, wherein said depleted sulphur dioxide-gas stream defines the stream of step (a);
    (e) feeding a first dry air stream to said furnace to provide sufficent oxygen for combustion of said sulphur to sulphur dioxide; and
    (f) feeding a second dry air stream, which directly bypasses the furnace and boiler, to said converter to provide sufficient oxygen for proper conversion of the remaining portion of said sulphur dioxide-containing gas to sulphur trioxide in said converter.

* * * * *